United States Patent Office 3,751,481
Patented Aug. 7, 1973

3,751,481
PROCESS FOR THE PRODUCTION OF
TERTIARY PHOSPHINES
Kurt Weinberg, Upper Saddle River, N.J., assignor to Union Carbide Corporation, New York, N.Y.
No Drawing. Filed Dec. 1, 1971, Ser. No. 203,829
Int. Cl. C07f 9/02
U.S. Cl. 260—601.5 P          8 Claims

ABSTRACT OF THE DISCLOSURE

A process for the production of tertiary phosphines which comprises contacting an aryl phosphine halide with powdered sodium, and thereafter reacting the product of said reaction with a hydrocarbyl halide, both of said reactions being conducted in an oxygen-free environment at a temperature and for a period of time sufficient to produce tertiary phosphines.

---

This invention relates to a process for the production of tertiary phosphines and more particularly to a process for the production of tertiary arylphosphines or mixed aryl alkyl phosphines by reacting an arylphosphine halide with a hydrocarbyl halide and powdered sodium in an oxygen-free environment.

Tertiary arylphosphines are valuable compositions that can be used as ligands in coordination compounds, and as extractants for metals. Heretofore, however, there has been no satisfactory economic method for the production of this class of compositions. To illustrate, known preparations of tertiary arylphosphines include the preparation of triphenylphosphine by reacting phenylphosphine dichloride with bromobenzene in the presence of slices of sodium which require a reaction time of 6 to 10 days. (See the publication by A. Michaelis and L. Gleichmann, Ber. 15,802 (1882).)

More recently, German Pat. 1,150,981 issued July 4, 1963 to Schindlbauer, Kirsch and Lalla, discloses the preparation of triphenylphosphine utilizing the expensive phosphorus trichloride as starting material. Unfortunately, the yields obtainable with phosphorus trichloride as starting material are not entirely satisfactory from a practical commercial standpoint.

W. Kuchen and H. Buchwald, Angewandte Chemie 1957, pp. 307–308, describe the preparation of diaryl alkyl phosphine utilizing tetraphenyldiphosphine and sodium as starting materials. The synthesis involves the production of diphenylphosphine sodium, which is then converted to an alkyl diaryl phosphine by reaction with an alkylbromide. However, this process is also not commercially attractive because of the cost of the starting materials. Thus, all of the processes described above are relatively undesirable because none is an economical method for producing tertiary arylphosphines and mixed aryl alkyl phosphines.

The present invention provides a useful and economical process for the production of tertiary arylphosphines and/or mixed tertiary aryl alkyl phosphines which comprises reacting a suitable arylphosphine halide with powdered sodium to produce sodium aryl phosphine and thereafter reacting the sodium aryl phosphine with a hydrocarbyl halide such as an aryl or alkyl halide, both reactions being conducted in an oxygen-free environment.

The suitable aryl phosphine halides are those of the structure $Ar_{3-n}$—P—$X_n$ where Ar is aryl of 6 to 14 carbon atoms such as phenyl, o-tolyl, naphthyl, phenantryl and anthracyl; X is halogen such as bromine and chlorine; n is 1 or 2.

Compositions according to the above include phenylphosphine dichloride, diphenylphosphine monochloride, 1-naphthylphosphine bromide, chlorotolylphosphine chloride and dichlorotolylphosphine chloride.

The suitable hydrocarbyl halides are those of the structure RX where R is alkyl of 1 to 25 carbon atoms; aryl of 6 to 14 carbon atoms; arylalkyl or substituted arylalkyl of 7 to 16 carbon atoms, such as benzyl and p-chlorobenzyl; alkaryl of 7 to 16 carbon atoms such as o-tolyl, p-tolyl and dimethylphenyl; and cycloalkyl of 3 to 15 carbon atoms such as cyclopropyl, cyclobutyl, cyclopentyl, cyclohexyl and cycloheptyl; X is as above defined.

The suitable arylphosphine halides can be obtained by the process disclosed in my U.S. Pat. 3,557,204 issued on Jan. 19, 1971 and assigned to Union Carbide Corporation.

Briefly, there is disclosed therein a process for the production of arylphosphine halides which comprises reacting an aryl halide with white phosphorus in the presence of a catalytic amount of a Lewis acid. The aryl halides that are employed can be represented by the formula $RX_m$ wherein R represents an aryl radical or an alkaryl radical, preferably a hydrocarbon aryl or alkaryl radical, having from 6 up to 10 or more carbon atoms and having a valance of $m$, wherein X represents a halo group, preferably a bromo, chloro or iodo group, and wherein $m$ represents a number having a value of from 1 to 3. Specific illustrative aryl halides include chlorobenzene, bromobenzene, iodobenzene, fluorobenzene, p-dichlorobenzene, the trichlorobenzenes, o-chlorotoluene, m-chlorotoluene, 2,4-dichlorotoluene, 1-chloronaphthalene, 1-bromonaphthalene, the bromotoluenes, the iodotoluenes and 1-iodonaphthalene.

The catalysts that are employed in the above patented process include stannic tetrachloride, titanium tetrachloride, aluminum triiodide, ferric triiodide, aluminum trifluoride, ferric trifluoride, ferric tribromide, and the like. The preferred catalysts include ferric trichloride, aluminum trichloride, aluminum tribromide, and ferric tribromide.

The proportions of the reactants employed in the above patented process are not narrowly critical. For example, the mol ratio of white phosphorus ($P_4$) : aryl halide can vary from about 1:½ to 1:60, preferably from about 1:2 to 1:12, and more preferably from about 1:4 to about 1:6. The Lewis acid catalyst is employed in small catalytic quantities. For example, the catalyst can be employed in a proportion of from about 0.1 weight to about 3 weight percent and preferably from about 0.2 weight percent to about 1.5 weight percent, based upon the total weight of the reactants.

The process described in U.S. Pat. 3,557,204 is carried out at elevated temperatures. The exact temperature employed is dependent somewhat upon the particular nature of the aryl halide reactant. For example, when an aryl chloride is the reactant, the operable temperature range is normally from about 280° C. to about 420° C., preferably from about 300° C. to about 400° C. and more preferably from about 330° C. to 360° C. When the aryl halide is an aryl bromide, the temperature which then can be employed will normally be within the range of from about 200° C. to about 450° C., preferably within the range of from about 250° C. to about 370° C., and more preferably from about 280° C. to about 300° C. When the aryl halide is an aryl iodide, the temperature range is preferably somewhat below the temperatures indicated for aryl bromides, for example, preferably from about 250° C. to about 290° C. When the aryl halide is an aryl fluoride, somewhat higher temperatures than those indicated for aryl chloride should preferably be employed. For example, a preferred temperature range when the aryl halide reactant is an aryl fluoride, will be from 400° C. to about 450° C.

For a more detailed description of the preparation of these starting materials, reference is made to the above mentioned patent.

Sodium is also employed as a reactant in the process of the present invention. It is critical to the successful practice of the process of the invention that the sodium be employed as fine particles averaging less than 3 millimeters in diameter and preferably less than 2 millimeters in diameter and most preferably less than 1 millimeter in diameter. As a general rule, I have found that the speed of reaction is increased in proportion to the decrease in size of the sodium particles. The powdered sodium can be prepared by introducing sodium (slices or pieces) into a hydrocarbon solvent having a boiling point at least equal or greater than the melting point of sodium. The mixture is then heated to its boiling point at which time the sodium melts. The melted sodium is then vigorously agitated with a suitable agitator such as a Hershberg stirrer, or alternatively, a vibrator may be employed. This technique is continued until the sodium is converted into a fine powder measuring about 3 mm. or less diameter (average) particle size.

When the starting material is an aryl phosphine dihalide, at least 4 mols of sodium are required per mol of aryl phosphine dihalide to convert all of the aryl phosphine dihalide to the aryl phosphine disodium. When the starting material is a diaryl phosphine monohalide, at least two mols of sodium are requiried per mol of diaryl phosphine monohalide to convert all of the diaryl phosphine monohalide to the diaryl phosphine sodium. From this it can be seen that a stoichiometric amount of sodium is needed to convert the starting material to its sodium derivative; however, large amounts can be employed if desired.

In general the reaction can be conducted at elevated temperatures such as from about 50° C. to about 150° C., preferably from about 100° C. to 130° C.

The reaction between the sodium and the aryl phosphine halide is carried out for a period of time sufficient to produce the sodium arylphosphine. It has now been found that this reaction can be completed within a period of time of from about 1 to 6 hours.

After formation of the arylphosphine sodium (which appears on visual observation as a yellow precipitate) the hydrocarbyl halide is added to the formed arylphosphine sodium. The hydrocarbyl halide is gradually added to the vessel containing the arylphosphine sodium with agitation and if desired additional solvent can be added at this time. The proportions of the reactants are also not narrowly critical except that too large an excess of hydrocarbyl halide would lead to quaternization of the tertiary phosphine. In general, therefore, stoichiometric amounts of hydrocarbyl halide and sodium arylphosphine are required. An excess of the hydrocarbyl halide as much as 20 mol percent can be used if desired.

Since the reaction is generally exothermic, the addition should be carried out without heating.

The reactant products form immediately on addition. After completion of the addition, the reaction mixture is heated to reflux temperature to complete the reaction.

Since the reaction is exothermic, it will, of course, be understood that the reaction is conducted in a vessel equipped with cooling means which serve to control the extent of heat formation. The reaction between the hydrocarbyl halide and the sodium arylphosphine is carried out for a period of time sufficient to produce the desired products, such as from about 30 to 120 minutes. The exact time, of course, will depend upon the nature of the reactants, the reaction temperature and the like.

In both of the reactions described above, the reaction is conducted in an oxygen-free atmosphere. Thus the reaction is conducted in an enclosed zone such as in an enclosed reactor under an oxygen-free or inert atmosphere or environment.

The products which can be produced according to the above general reactions have the structure $Ar_{3-n}$—P—$R_n$ wherein Ar, R and $n$ have the above indicated values. Merely as illustrative, the following products can be obtained according to the above general reactions: triphenylphosphine, tri(1-naphthyl)phosphine, tri(p-tolyl)phosphine, hexyldiphenylphosphine, dihexylphenylphosphine, didecylphenylphosphine, and decyldiphenylphosphine.

I have further found that in preparing the commercially important compound triphenylphosphine, that this compound can be produced in a one step procedure by mixing the suitable reactants, e.g., phenylphosphine dichloride and chlorobenzene together with the powdered sodium in a low boiling solvent such as diethylether and agitating the mixture in an oxygen-free atmosphere at reflux temperature.

The following examples illustrate the present invention.

EXAMPLE 1

Preparation of phenyldioctylphosphine

A solution of 35.8 g. (.2 mol) of phenylphosphine dichloride in 30 ml. of xylene was added to a stirred suspension of 20.2 g. (.88 gram-atom) of sodium powder having a particle size of less than 3 mm. in diameter, in a dry oxygen-free atmosphere at 40–50° C. After the addition was completed the mixture was refluxed with stirring for an additional 6 hours. During this time 1.5 ml. portions of dibutylether were added to the reaction mixture every 60 minutes to accelerate the formation of phenylphosphine disodium. The original grey mixture turned olive green after about 4 hours. The stirring and refluxing was continued for another 2 hours. The mixture was then cooled to room temperature and a solution of 77.2 (.4 mol) of 1-bromooctane in 60 ml. of xylene was added to the mixture with stirring over a period of 2 hours. After the addition was completed the reaction mixture was refluxed in an inert atmosphere for 15 minutes and thereafter about 300 ml. of diethylether was added. 55 ml. of water was then added slowly to the mixture. The resulting layers were separated and the top layer was dried over magnesium sulfate and distilled in vacuum. The phenyldioctylphosphine distilled at 198–206° C./.8 mm. (Note: All operations were conducted under nitrogen.)

EXAMPLE 2

Preparation of phenyldihexylphosphine

A solution of 35.8 g. (.2 mol) of phenylphosphine dichloride in 30 ml. of xylene was added to a stirred suspension of 20.2 g. (.88 gram-atom) of sodium powder having a particle size of less than 3 mm. in diameter, in a dry oxygen-free atmosphere at 40–50° C. After the addition was completed the mixture was refluxed with stirring for an additional 6 hours. During this time 1.5 ml. portions of dibutylether were added to the reaction mixture every 60 minutes to accelerate the formation of phenylphosphine disodium. The original grey mixture turned olive green after about 4 hours. The stirring and refluxing was continued for another 2 hours. The mixture was then cooled to room temperature and a solution of 66 g. (0.4 mole) of n-hexyl bromide in 60 ml. of xylene was added to the mixture with stirring over a period of 2 hours. After the addition was completed the reaction mixture was refluxed in an inert atmosphere for 15 minutes and thereafter about 300 ml. of diethylether was added. 55 ml. of water was then added slowly to the mixture. The resulting layers were separated and the top layer was dried over magnesium sulfate and distilled in vacuum. The phenyldihexylphosphine distilled at 135–140° C./.8 mm. (Note: All operations were conducted under nitrogen.)

EXAMPLE 3

Preparation of phenyldidecylphosphine

A solution of 35.8 g. (.2 mol) of phenylphosphine dichloride in 30 ml. of xylene was added to a stirred suspension of 20.2 g. (.88 gram-atom) of sodium powder having a particle size of less than 3 mm. in diameter, in a dry oxygen-free atmosphere at 40–50° C. After the addition was completed the mixture was refluxed with stirring for an additional 6 hours. During this time 1.5 ml. portions of dibutylether were added to the reaction mixture every 60 minutes to accelerate the formation of phenylphosphine disodium. The original grey mixture turned olive green after about 4 hours. The stirring and refluxing was continued for another 2 hours. The mixture was then cooled to room temperature and a solution of 88.5 g. (.4 mol) of n-decyl bromide in 60 ml. of xylene was added to the mixture with stirring over a period of 2 hours. After the addition was completed the reaction mixture was refluxed in an inert atmosphere for 15 minutes and thereafter about 300 ml. of diethylether was added. 55 ml. of water was then added slowly to the mixture. The resulting layers were separated and the top layer was dried over magnesium sulfate and distilled in vacuum. The phenyldidecylphosphine distilled at 196–205° C./.33 mm. (Note: All operations were conducted under nitrogen.)

EXAMPLE 4

Preparation of isopropyldiphenylphosphine

A solution of 22.1 g. of diphenylphosphine chloride (.1 mol) in 30 ml. of xylene was added slowly to a suspension of 6.1 g. of sodium powder (.265 gram-atom) having a particle size measuring less than 3 mm. diameter, in 60 ml. of hot xylene under nitrogen. After completion of the addition, refluxing and stirring was continued for an additional one hundred minutes. 14.6 g. of isopropylbromide in 25 ml. of xylene was then added and stirring continued for about 25 minutes. The reaction mixture was then filtered and the filtrate distilled under reduced pressure. The isopropyldiphenylphosphine distilled at 135–139° C./1.5 mm. Hg. The yield was 18 g. or 79 percent of theory.

EXAMPLE 5

Preparation of n-propyldiphenylphosphine

A solution of 22.1 g. of diphenylphosphine chloride (.1 mol) in 30 ml. of xylene was added slowly to a suspension of 6.1 g. of sodium powder (.265 gram-atom) having a particle size measuring less than 3 mm. diameter, in 60 ml. of hot xylene under nitrogen. After completion of the addition, refluxing and stirring was continued for an additional one hundred minutes. 14.6 g. of n-propylbromide in 25 ml. of xylene was then added and stirring continued for about 25 minutes. The reaction mixture was then filtered and the filtrate distilled under reduced pressure. The n-propyldiphenylphosphine distilled at 164° C./13 mm. Hg. The yield was 82 percent of theory.

EXAMPLE 6

Preparation of triphenylphosphine

A mixture of 17.9 g. (.1 mol) of phenylphosphine dichloride and 22.5 g. (.2 mol) of chlorobenzene in 80 ml. of diethyl ether is added to a suspension of 14.7 g. of sodium powder having a particle size of less than 2 mm. diameter in 35 ml. diethyl ether. After refluxing and stirring the mixture in an oxygen-free atmosphere for 2 hours it is filtered under nitrogen and the solvent of the filtrate evaporated. The yield of triphenylphosphine was 69 percent of the theoretical (based on phosphorus).

EXAMPLE 7

Preparation of triphenylphosphine

A mixture of 22.1 g. (.1 mol) of diphenylphosphine chloride and 13.7 g. (.12 mol) of chlorobenzene in 80 ml. of diethyl ether is added to a suspension of 6 g. sodium powder (.26 gram-atom) in 60 ml. of diethyl ether. After stirring and refluxing the mixture in an oxygen-free atmosphere for 2½ hours it was filtered under nitrogen and the solvent of the filtrate evaporated. The yield of the triphenylphosphine was 92 percent of the theoretical (based on phosphorus).

Instead of using phenylphosphine dichloride and diphenylphosphine chloride separately as starting materials, a mixture of these two reactants may be used and reacted with sodium and chlorobenzene in an analogous manner.

Although the invention has been illustrated by the preceding examples, it is not to be construed as limited to the materials employed therein, but rather the invention encompasses the generic area as hereinbefore disclosed. Various changes and modifications can be made in practicing the present invention without departing from it and, therefore, it is intended to include in the scope of the appended claims all such modifications and variations as may be apparent to those skilled in the art from the description and illustrative examples given herein.

What is claimed is:

1. A process for the production of tertiary phosphines which comprises contacting an arylphosphine halide having the formula $$Ar_{3-n}-P-X_n$$

wherein Ar is aryl or aralkyl of 6 to 14 carbon atoms; X is halogen and $n$ is 1 or 2, with powdered sodium, and thereafter reacting the product of said reaction with a hydrocarbyl halide having the formula $$RX$$

wherein R is an alkyl of 1 to 25 carbon atoms; aryl of 6 to 10 carbon atoms; aralkyl of 7 to 16 carbon atoms; and cycloalkyl of 3 to 15 carbon atoms; X is as above defined; both of said reactions being conducted in an oxygen-free environment at a temperature and for a period of time sufficient to produce tertiary phosphines.

2. A process according to claim 1 wherein said powdered sodium has an average particle size of less than 3 mm. in diameter.

3. A process according to claim 2 wherein said arylphosphine halide is phenylphosphine dichloride.

4. A process according to claim 2 wherein said arylphosphine halide is diphenylphosphine chloride.

5. A process according to claim 2 wherein said hydrocarbyl halide is n-octyl bromide.

6. A process according to claim 2 wherein said hydrocarbyl halide is n-hexyl bromide.

7. A process for the production of triphenyl phosphine which comprises contacting phenylphosphine dichloride with chlorobenzene in the process of powdered sodium having a particle size of less than 3 mm. diameter, said reaction being conducted in an oxygen-free atmosphere at a temperature and for a period of time sufficient to produce triphenylphosphine.

8. A process according to claim 7 wherein diphenylphosphine chloride is substituted for phenylphosphine dichloride.

References Cited
UNITED STATES PATENTS 3,652,678  3/1972  Allum et al. _____ 260—606.5 P
3,423,468  1/1969  Zorn et al. _____ 260—606.5 P WERTEN F. W. BELLAMY, Primary Examiner